June 2, 1953   L. V. FRANCIS   2,640,634
PORTABLE CLOTHES CARRIER FOR AUTOMOBILES
Filed April 4, 1950
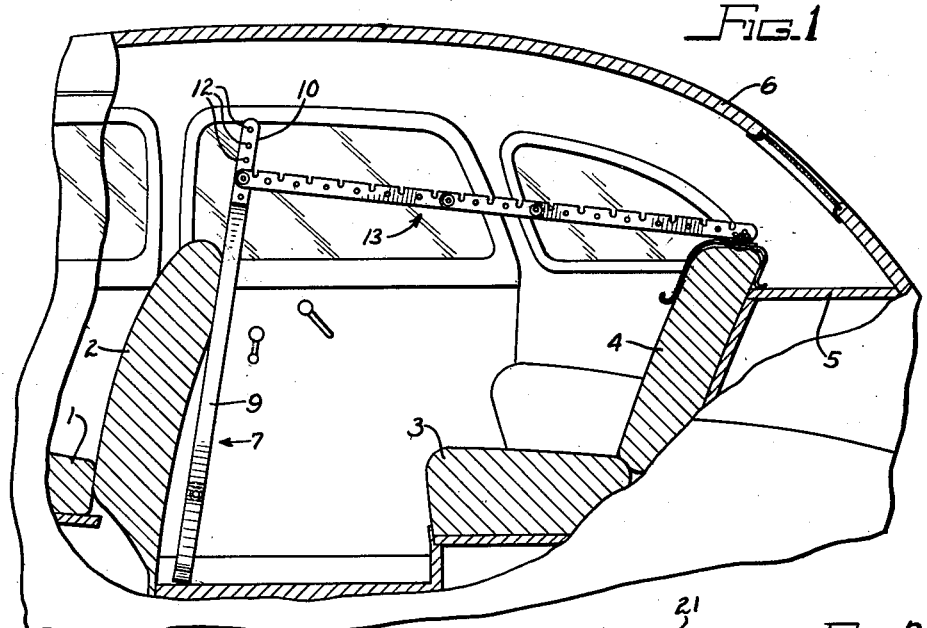
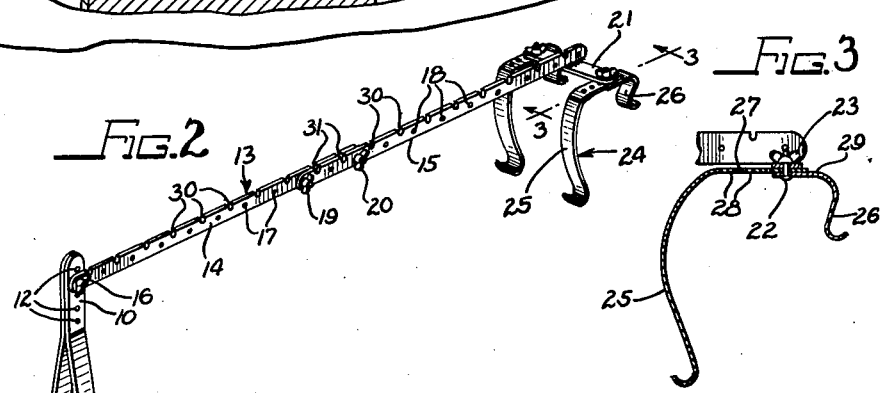
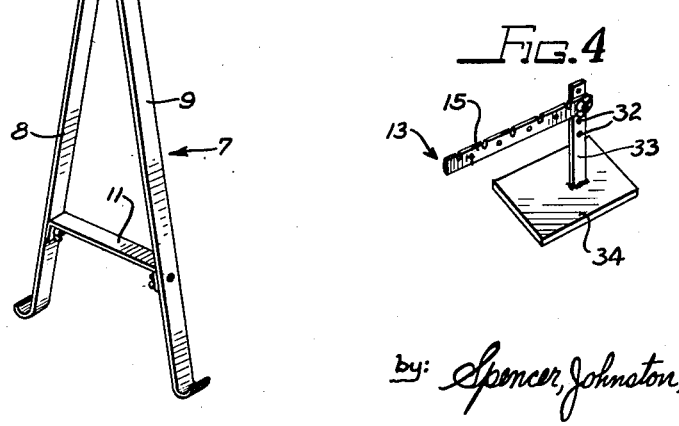
Inventor
Lester V. Francis
by: Spencer, Johnston, Cook & Root
attys.

Patented June 2, 1953

2,640,634

UNITED STATES PATENT OFFICE 2,640,634

PORTABLE CLOTHES CARRIER FOR AUTOMOBILES

Lester V. Francis, Round Lake, Ill.

Application April 4, 1950, Serial No. 153,822

3 Claims. (Cl. 224—29)

This invention relates in general to portable clothes carriers and particularly to a clothes carrier especially adapted for use for carrying a multiplicity of suits, coats, and the like, in an automobile.

The invention herein is particularly useful when the user thereof is on an extended trip because it has the advantage of being able to support a multiplicity of hangers and uses a comparatively small amount of space on the interior of the car.

An important object of the present invention is to provide a portable clothes carrier for automobiles adapted to be located in the rear of the car behind the front seat.

Another object of the invention is to provide a clothes carrier for automobiles which is provided with a supporting bar adapted to support a plurality of hangers and which extends from the back of the front seat to the back of the rear seat.

A further object of the invention is to provide a clothes carrier for automobiles adapted to support a multiplicity of clothes between the back of the front seat and the back of the rear seat and wherein the device is adjustable so that it may be adapted for use in all types of cars having a rear seat whether it be a large sedan or a smaller club coupe.

Still another object of the invention is to provide a portable clothes carrier for automobiles which consists of a supporting standard at one end thereof adapted to be placed on the floor of the car behind the front seat and which has a portion thereon extending rearwardly to the back of the rear seat, said last-named portion being adapted to support a plurality of hangers having clothes thereon.

A still further and more specific object of the invention is to provide a portable clothes carrier for automobiles wherein a supporting standard rests on the floor of the car immediately behind the front seat and which has a clothes supporting bar extending rearwardly from the upper end thereof to the back of the rear seat and wherein yieldable clamping members support the rear end of the bar to maintain the carrier rigid, said yieldable clamping members being adapted to receive between the sides thereof the upper part of the back seat, regardless of the thickness thereof.

Other objects and advantages of the invention will become apparent upon reading the following description taken in conjunction with the accompanying drawing in which:

Fig. 1 is a fragmentary longitudinal vertical section through an automobile illustrating the invention in side elevation as actually used therein;

Fig. 2 is a perspective view of the clothes carrier embodying the invention;

Fig. 3 is an enlarged fragmentary vertical sectional view taken along the plane of line 3—3 of Fig. 2; and Fig. 4 is a perspective view showing a modified form of supporting means at one end of the carrier.

Referring now more particularly to the drawing, Fig. 1 illustrates a portion of a car body and the interior thereof having a front seat 1 provided with a back 2. Spaced rearwardly from the back of the front seat 2 there is provided a rear seat 3 having a back 4 thereon. Whether the automobile be a four-door sedan, or a two-door sedan, or club coupe, there is customarily provided a shelf 5 extending rearwardly adjacent the upper end of the back 4 of the rear seat to a point where it joins the downwardly curved portion at the rear of the top 6.

The clothes carrier embodying the present invention is adapted to be supported between the back 2 of the front seat and the back 4 of the rear seat. Fig. 2 illustrates the invention which consists of a standard generally indicated at 7 which comprises legs 8 and 9. These legs are preferably spread apart at their lower ends and are joined together at their upper ends, such as by welding, or the like. The upper end of each leg 8 and 9 has a vertically extending part 10 adapted to abut each other so that they may be secured together at this point. One or more suitable braces 11 may extend between and be secured to the legs 8 and 9 at a suitable point along their length.

The upper end 10 of the standard 7 is preferably provided with a plurality of vertically spaced openings 12. A supporting bar 13, preferably consisting of two members 14 and 15 extends rearwardly from the upper end of the standard 7. Different makes and styles of automobiles may require the front end of supporting bar 13 to be supported at different heights for convenience. For this reason the front end of one of the members 14 may be detachably and adjustably mounted to the upper end of the standard 7 by having a bolt extend through the openings 12 and into an opening at the forward end of member 14 so that the member may be secured in place by means of a wing nut 16.

The supporting bar 13 is also adjustable as to length in order that the invention may be utilized with different types and styles of automobiles wherein the rear seat is spaced at varying distances from the front seat. The longitudinal adjustment of the supporting bar 13 is preferably accomplished by providing in the member 14 thereof a plurality of spaced openings 17, and by providing in the member 15 a plurality of similarly spaced openings 18. When the proper length of the supporting bar 13 has been determined, the corresponding openings 17 in member 14 may be brought into alignment with certain of the openings 18 in member 15, whereupon the two members may be secured together by a suitable number of bolts passing through the aligned openings in the two members and secured in place by means such as the wing nuts 19 and 20.

Thus far it will be evident that the invention provides a vertical adjustment as between the standard 7 and the supporting bar 13 as well as a horizontal adjustment to vary the length of the bar 13 itself.

In the preferred form of the invention a crossbar 21 is secured, such as by welding, to the rear end of supporting bar 13 in a direction transversely thereto. The outer ends of the crossbar 21 are each provided with an opening adapted to receive a bolt 22 to be tightened by a wing nut 23. Yieldable means are also provided to receive the upper part of the back of the rear seat and to clamp thereagainst to hold the clothes carrier against shifting or other inadvertent movement. Such a yieldable device is indicated generally in the drawings by the numeral 24. It is preferred that one of these devices be mounted at each end of the crossbar 21 and held thereto by means of the bolt 22 and nut 23.

The yieldable device 24 consists of a substantially S-shaped leg 25 and a second similarly shaped leg 26 considerably shorter than leg 25.

It would be possible to form these legs 25 and 26 of a single piece of metal, but in order that these legs may be adjusted to accommodate the backs of seats having various widths or thicknesses, it is desirable to form these two leg members separately. Leg 25 has a horizontally extending upper portion 27 provided with a plurality of spaced openings 28. The leg 26 also has an upper horizontal portion 29 adapted to underlie the horizontal portion 27 of leg 25, as shown in Fig. 3. The two overlapping ends of legs 25 and 26 are positioned so that one of the openings 28 is brought into alignment with the opening in the horizontal portion 29, whereby the bolt 22 may be received therethrough. The nut 23 may then be tightened to retain the yieldable legs 25 and 26 in adjusted position.

Fig. 3 illustrates the two legs 25 and 26 in the position where they are spaced apart the greatest distance. If the apparatus is to be used with an automobile wherein the back of the rear seat has less thickness, then the larger leg 25 may be moved toward the smaller leg 26 and the bolt 22 may be received in one of the other openings 28 so that the yieldable legs will still have a clamping action on the narrower back.

Each of the members 14 and 15 comprising the supporting bar 13 is provided with a plurality of downwardly extending notches or recesses 30 in the upper edge thereof of such size as to receive the hook member of a clothes hanger. In this way the hangers are held in spaced apart relation and are not permitted to slide along the length of the supporting bar. The notches 30 in both of the members 14 and 15 are spaced apart the same distance so that the corresponding notches on each member will be brought into alignment along the overlapping portions of these members as shown at 31 in Fig. 2.

In actual use it has been found preferable to have the supporting bar 13 slope downwardly toward the rear a slight amount, as shown in Fig. 1. The weight of the clothes on this bar will also aid in wedging the supporting standard 7 in place and will prevent shifting thereof. The spaced apart bottoms of legs 8 and 9 provide a firm support for the standard and when the length of supporting bar 13 is properly adjusted, the clamping action of the spaced clamping members 24 at the rear end of the bar will hold the apparatus rigidly in place. The entire apparatus may be set in the rear of the car along one side thereof and will still permit sufficient room for other passengers to occupy the rear seat.

The foregoing described preferred form of the invention constitutes a portable clothes carrier for universal use in all types, sizes and makes of automobiles. It is also possible, however, to modify the supporting means at the rear end of the bar 13 in such a way that it may be useful with certain types and styles of automobile bodies. This modified form is illustrated in Fig. 4. In this case the rear end of member 15 of the supporting bar 13 is adjustably secured to any one of a plurality of vertically spaced openings 32 in a vertically extending bar 33. The bar 33 is rigidly secured such as by welding, or the like, to a suitably shaped base 34. The base 34 will then be adapted to rest on the shelf 5 which extends rearwardly from the back of the rear seat.

This latter form of the invention, however, does not have universal application because the shelf 5 may vary in depth depending on the car make and style. It would then become necessary in actual practice to manufacture the apparatus with bases 34 of a predetermined number and size to accommodate certain makes and styles of automobiles.

The result of this modified form, however, is equally successful because the length of the supporting bar 13 can still be adjusted to proper length and the construction including the base 34 and the upright bar 33 will be sufficiently rigid to prevent inadvertent shifting of the apparatus. The rear end of bar 13 may also be regulated as to height to accommodate the particular structure of the car body at this point.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A portable clothes carrier for automobiles, comprising a supporting standard adapted to rest on the car floor behind the front seat and extending upwardly therefrom, said standard including a pair of legs spaced apart at their lower ends and converging upwardly, means securing together the upper ends of said legs, hanger supporting means mounted on said standard adjacent the upper end thereof and extending rearwardly therefrom, and means associated with the rear end of said supporting means to support the carrier and hold it against shifting.

2. A portable clothes carrier for automobiles, comprising a supporting standard adapted to rest on the car floor behind the front seat and extending upwardly therefrom, said standard including a pair of legs spaced apart at their lower ends and converging upwardly, means securing together the upper ends of said legs, hanger supporting means extending rearwardly from the upper end of said standard, means for mounting said supporting means adjustably on the upper portion of said standard for adjustment in a vertical plane, means for adjusting the length of said supporting means, and means adjacent the rear end of said supporting means to hold the carrier against shifting.

3. A portable clothes carrier for automobiles, comprising a supporting standard adapted to rest on the car floor behind the front seat and extending upwardly therefrom, said standard including a pair of legs spaced apart at their lower ends and converging upwardly, means securing together the upper ends of said legs, a bar extending rearwardly from the upper end of said standard, a plurality of recesses in the upper edge of said bar and spaced along the length thereof each adapted to receive a clothes hanger, and means adjacent the rear end of said bar to hold the carrier against shifting.

LESTER V. FRANCIS.

References Cited in the file of this patent

UNITED STATES PATENTS

| Number | Name | Date |
| --- | --- | --- |
| 1,171,531 | Muther | Feb. 15, 1916 |
| 1,198,084 | Tappan | Sept. 12, 1916 |
| 1,316,662 | Winzeler | Sept. 23, 1919 |
| 1,429,390 | Williams | Sept. 19, 1922 |
| 1,688,225 | Belohlavek | Oct. 16, 1928 |
| 2,476,476 | Bayler et al. | July 19, 1949 |
| 2,510,175 | Hess et al. | June 6, 1950 |
| 2,526,285 | Schuyler | Oct. 17, 1950 |
| 2,536,765 | North | Jan. 2, 1951 |
| 2,543,202 | Robinson | Feb. 27, 1951 |